(No Model.)
P. B. MATHIASON.
AMALGAMATOR.
No. 459,639. Patented Sept. 15, 1891.
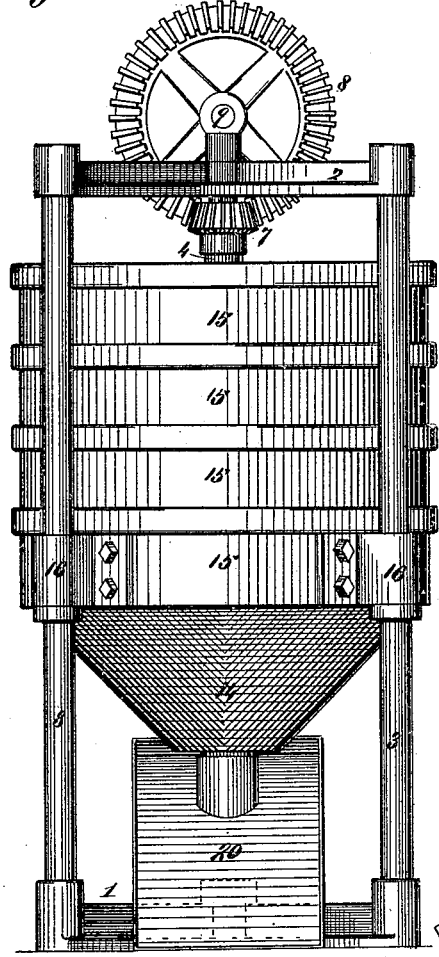
Fig. I.
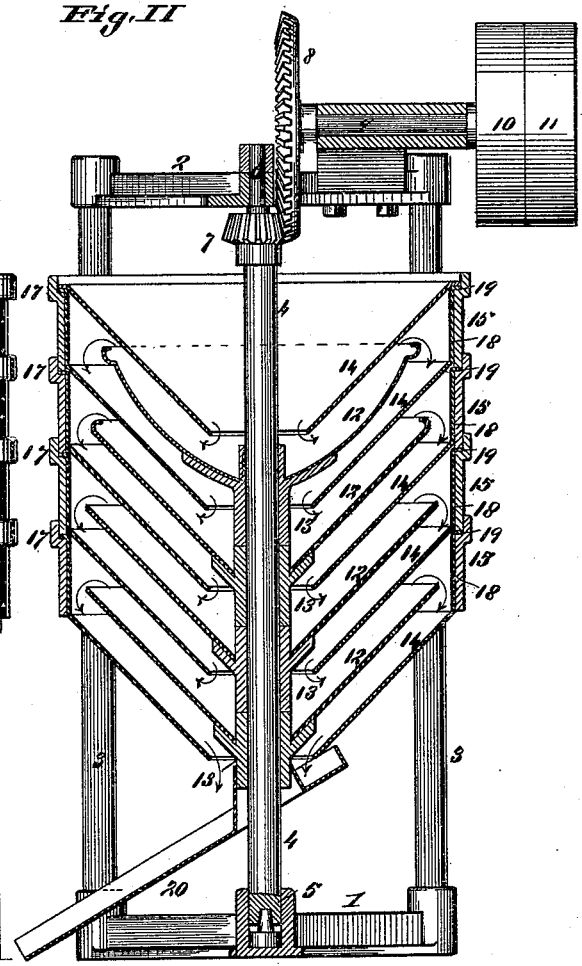
Fig. II.
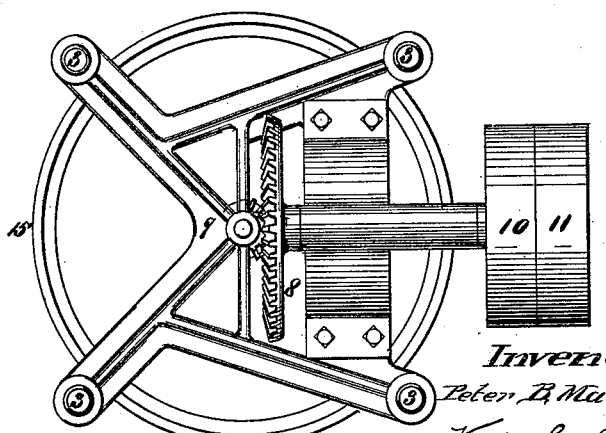
Fig. III.
Attest:
E. Arthur
M. E. Durand
Inventor:
Peter B. Mathiason
By Knight Bro
atty's

UNITED STATES PATENT OFFICE.

PETER B. MATHIASON, OF ST. LOUIS, MISSOURI.

AMALGAMATOR.

SPECIFICATION forming part of Letters Patent No. 459,639, dated September 15, 1891.

Application filed March 12, 1890. Serial No. 343,589. (No model.)

*To all whom it may concern:*

Be it known that I, PETER B. MATHIASON, of the city of St. Louis, in the State of Missouri, have invented a certain new and useful Improvement in Ore-Amalgamators, of which the following is a full, clear, and exact description, reference being had to the accompanying drawings, forming part of this specification.

My invention relates to certain improvements in machines or apparatuses for the amalgamation or separation of ores from refuse matter; and my invention consists in features of novelty hereinafter fully described, and pointed out in the claim.

Figure I is a side elevation of my improved apparatus. Fig. II is a vertical longitudinal section, and Fig. III is a top view.

Referring to the drawings, 1 represents a suitable base, and 2 a suitable top piece.

3 represents the tie-rods connecting the top piece or frame to the bottom piece or frame.

4 represents a vertical shaft or spindle passing centrally through the machine, and which, as shown at 5, Fig. II, is stepped into the lower frame or base 1, and is also journaled, as shown at 6, in the upper frame or top piece 2.

7 represents a pinion on the shaft or spindle 4, which is engaged by a gear-wheel 8 on a shaft 9, journaled to the top piece and provided with a driving-pulley 10 and a loose pulley 11 to receive the operating-belt.

12 represents a number of pans secured to the shaft or spindle 4, preferably by means of hubs 13, resting one upon another, as shown in Fig. II. The pans are preferably made cone-shaped, or, in other words, inclined in an outwardly and upwardly direction from their respective hubs. They are open at the top, and the hub of each extends above the bottom edge of each pan, so as to form a close joint at the bottom. The hubs make a rigid connection between the pans and the shaft, so that the former turn with the latter.

14 represents a number of fixed pans interposed between the shaft-pans, and which are preferably held in place by annular rings 15, the lower one of which is secured to the tie-rods 3, as shown at 16, and by which it is supported, and through which the other rings are supported, as one rests upon another. Each ring is provided with an upper flange 17, within which the lower edge of the ring above fits. The pans 14 are provided with vertical portions 18, which fit against the inner face of the rings, and the upper edges 19 of these vertical portions of the pans are turned outwardly and fit between the rings, as clearly shown in Fig. II. The pans are thus supported and held in place. The pans are preferably of cone shape, or, in other words, inclined in a downwardly and inwardly direction from the lower edges of their respective vertical portions 18. The lower ends of the pans are left open by not extending quite to the hubs of the shaft-pans 12. I have shown the upper pan 12 of concave or semi-spherical shape as well as conical, and the other pans 12 may be of this shape instead of the shape shown, as I find this to be a very efficient form. I have also shown an inwardly-projecting flange on the upper edge of the two top pans, which is very effective in keeping the mercury in the pans. A pan formed like the top one in Fig. II produces the most beneficial results.

20 represents a delivery-spout into which the lower pan deposits the stuff.

The operation of the machine is as follows: The pans being first coated with mercury, the stuff containing the precious metal is thrown into the upper pan 14 and the shaft 4 is set in motion. As the stuff falls from the upper pan 14 into the upper pan 12 it is carried by centrifugal force up the sides of the pan 12, and, as shown by the arrow, passes over the upper edge of this pan onto the pan 14, down which it gravitates. By providing the top pan, or more of them, if desired, with the groove shown in Fig. II the mercury is prevented from passing over the edge of this pan, while the passage of the stuff is not retarded. Of course there is an outward tendency of the stuff while it is moving in an upwardly direction along the pan 12, and this assists in causing the heavier precious metals to reach the surface of the pan and prevent its being carried over the edge of the pan. As the stuff moves down the second pan 14 from the top it is deposited on the second pan 12 from the top, up which it is carried by the centrifugal action and over the upper edge of which it is deposited onto the third pan 14 and down which it gravitates. Thus the operation goes on, any desired number of pans being used, the intention being to have a sufficient number to effect the removal of all the precious metal by the time the stuff reaches the bottom of the series of pans. In this manner a very cheap and effective machine is produced, and one which is comparatively easy and simple to operate.

I claim as my invention—

In an amalgamator, the combination of an operating-shaft, a number of pans secured to the shaft and extending in an upward and outward direction therefrom, a number of fixed pans interposed between the shaft-pans, and a series of annular rings 15, said fixed pans being provided with open lower ends, upright portions 18, and flanges 19, substantially as and for the purpose set forth.

PETER B. MATHIASON.

In presence of—
THOMAS KNIGHT,
E. S. KNIGHT.